(12) United States Patent
Libby et al.

(10) Patent No.: US 9,972,883 B1
(45) Date of Patent: May 15, 2018

(54) POLES FOR SUPPORTING SATELLITE DISHES

(71) Applicant: WECONNECT LLC, Seymour, WI (US)

(72) Inventors: Brad Libby, Lowell, ME (US); Gary Rumpf, Middletown, CT (US)

(73) Assignee: WeConnect LLC, Seymour, WI (US)

( * ) Notice: Subject to any disclaimer, the term of this patent is extended or adjusted under 35 U.S.C. 154(b) by 0 days. days.

(21) Appl. No.: 15/486,473

(22) Filed: Apr. 13, 2017

(51) Int. Cl.
| | |
|---|---|
| *H01Q 1/12* | (2006.01) |
| *E04H 12/22* | (2006.01) |
| *F16M 11/22* | (2006.01) |
| *H01Q 1/48* | (2006.01) |

(52) U.S. Cl.
CPC ....... *H01Q 1/1242* (2013.01); *E04H 12/2215* (2013.01); *F16M 11/22* (2013.01); *H01Q 1/48* (2013.01)

(58) Field of Classification Search
CPC .... H01Q 1/1242; H01Q 1/48; E04H 12/2215; F16M 11/22
See application file for complete search history.

(56) References Cited

U.S. PATENT DOCUMENTS

| | | | | |
|---|---|---|---|---|
| 3,200,554 A * | 8/1965 | Goodman | ............... | A47B 91/00 362/431 |
| 3,285,554 A * | 11/1966 | Voelkerding | ............ | E01F 9/685 211/196 |
| RE26,779 E * | 2/1970 | Weichenrieder | ........ | E01F 9/646 116/173 |
| 3,731,517 A * | 5/1973 | Johnson | ..................... | B05B 1/04 29/890.08 |
| 4,407,089 A * | 10/1983 | Miller | ..................... | A01K 97/10 43/21.2 |
| 5,022,618 A * | 6/1991 | Barrett | ............... | A47G 29/1216 232/39 |
| 5,349,780 A * | 9/1994 | Dyke | ..................... | A01G 9/122 24/458 |
| 5,848,502 A * | 12/1998 | Schaefer | ............. | E04H 12/2215 248/156 |
| 6,234,444 B1* | 5/2001 | Haddad | .................. | A01G 9/122 248/156 |
| 6,922,942 B2* | 8/2005 | Stefanutti | .............. | A01G 17/14 248/530 |
| 7,412,866 B2* | 8/2008 | Jahani | ..................... | B21C 25/08 301/124.1 |

(Continued)

*Primary Examiner* — Anita M King
(74) *Attorney, Agent, or Firm* — Andrus Intellectual Property Law, LLP

(57) ABSTRACT

A device having first and second ends and a body extending therebetween for supporting an object. A first mount section is closer to the first end than the second end, has a first cross-section, and is configured to be coupled to the object. A second mount section is closer to the second end than the first end, has a second cross-section, and is configured to be coupled to the object. A main section between the first mount section and the second mount section has a main cross-section. A first indentation in the body is closer to the first end than to the second end and a second indentation in the body is closer to the second end than to the first end. The first cross-section is different than the main cross-section and the device is configured to be installed such that the first or second indentation is below the ground.

15 Claims, 3 Drawing Sheets

(56) References Cited

U.S. PATENT DOCUMENTS

| | | | |
|---|---|---|---|
| 7,905,053 B2 * | 3/2011 | Lisciotti | A01G 17/14 47/47 |
| 7,980,520 B2 * | 7/2011 | Taylor | A45F 3/44 248/156 |
| 9,671,061 B2 * | 6/2017 | Meiners | F16M 13/02 |

* cited by examiner

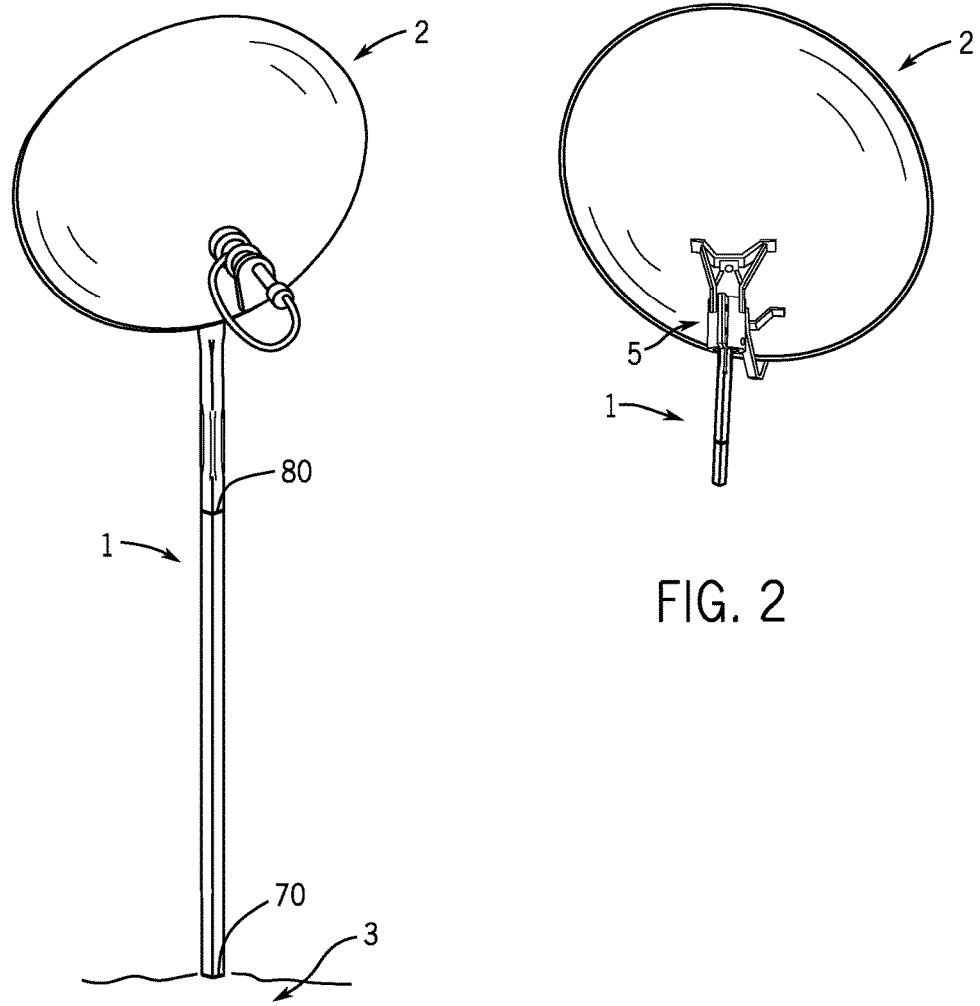

POLES FOR SUPPORTING SATELLITE DISHES

FIELD

The present disclosure generally relates to poles for supporting a satellite dish, and more particularly to poles for supporting satellite dishes having better performance, more flexibility, and easier installation.

BACKGROUND

The Background and Summary are provided to introduce a foundation and selection of concepts that are further described below in the Detailed Description. The Background and Summary are not intended to identify key or essential features of the claimed subject matter, nor are they intended to be used as an aid in limiting the scope of the claimed subject matter.

Over the past few decades, new technology and innovations have allowed consumers to send and receive communications over long distances wirelessly, using satellites. Information is sent to and received from satellites orbiting the Earth by means of satellite dishes located at home, commercial, or industrial locations. These modern systems are sometimes referred to as direct-broadcast satellite television (DBSTV) systems, also known as "direct-to-home" (DTH) systems. DTH systems typically require installing an outdoor parabolic antenna, commonly referred to as a satellite dish of "dish", that is directed towards the transmitting satellite orbiting the Earth above. These satellite dishes are typically supported by a pole, which is either anchored into the ground or mounted to the roof or siding of a house. In a typical arrangement, the back or convex side of the parabolic dish is coupled to a mounting clamp that clamps onto this pole, allowing the satellite dish to remain fixed relative to the pole after the dish is in proper alignment to the satellite. A pole for ground assembly is typically 6' or 8' tall.

SUMMARY

One embodiment of the present disclosure generally relates to a device configured to support an object above the ground, the device comprising a first end and a second end that is opposite the first end with an axis defined between the first end and the second end. A body surrounds the axis and extends from the first end to the second end. A first mount section of the body is closer to the first end than to the second end and the first mount section has a first cross-section and is configured to be coupled to the object. A second mount section of the body is closer to the second end than to the first end and the second mount section has a second cross-section and is configured to be coupled to the object. A main section of the body is between the first mount section and the second mount section and the main section has a main cross-section. The device includes a first indentation in the body. The first indentation is closer to the first end than to the second end and a second indentation in the body is closer to the second end than to the first end. The first cross-section is different than the main cross-section and the device is configured to be installed in the ground such that one of the first indentation or the second indentation are below the ground.

Another embodiment generally relates to a method for supporting an object above the ground, the method comprising providing a device having a first end and a second end that is opposite the first end with an axis defined between the first end and the second end. A body surrounds the axis and extends from the first end to the second end. A first mount section of the body is closer to the first end than to the second end and the first mount section has a first cross-section and is configured to be coupled to the object. A second mount section of the body that is closer to the second end than to the first end and the second mount section has a second cross-section and is configured to be coupled to the object. A main section of the body is located between the first mount section and the second mount section and the main section has a main cross-section with the first cross-section being different than the main cross-section. The method further includes indenting the body at a first indentation, where the first indentation is closer to the first end than to the second end. The body is also indented at a second indentation with the second indentation being closer to the second end than to the first end. The method further includes coupling the object to one of the first mount section or the second mount section. A ground end is the one of the first mount section or the second mount section that is not coupled to the object. The method further includes installing the ground end of the device into the ground such that one of the first indentation or the second indentation is in the ground.

Another embodiment generally relates to a device configured to support a satellite dish above the ground, the device having a first end and a second end that is opposite the first end with an axis defined between the first end and the second end. A body surrounds the axis and extends from the first end to the second end. A first mount section of the body is closer to the first end than to the second end and the first mount section has a first cross-section that is circular and is configured to be coupled to the satellite dish. A second mount section of the body is closer to the second end than to the first end and the second mount section has a second cross-section that is circular and is configured to be coupled to the satellite dish. A main section of the body is between the first mount section and the second mount section. The main section has a main cross-section that is hexagonal. A first indentation projects inwardly from the body of the main section towards the axis and the first indentation is closer to the first mount section than to the second mount section. A second indentation projects inwardly from the body of the main section towards the axis and the second indentation is closer to the second mount section than to the first mount section. The first cross-section has a first area and the second cross-section has a second area that is different than the first area.

Various other features, objects and advantages of the disclosure will be made apparent from the following description taken together with the drawings.

BRIEF DESCRIPTION OF THE DRAWINGS

The drawings illustrate the best mode presently contemplated of carrying out the disclosure. The same numbers are used throughout the drawings to reference like features and like components. In the drawings:

FIG. 1 is an exemplary view of a device in accordance with the present disclosure, supporting a satellite dish;

FIG. 2 shows an exemplary mounting device on the back of a satellite dish to couple the satellite dish to a pole;

DETAILED DISCLOSURE

Figure 3:
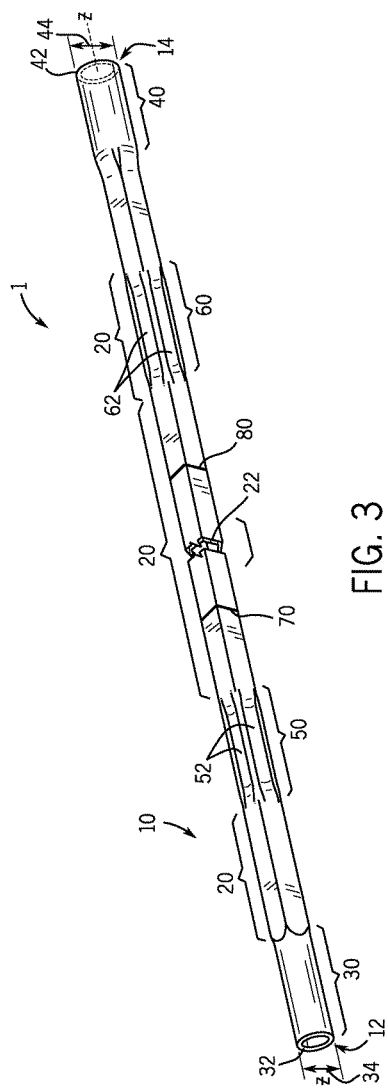
FIG. 3 is an isometric view of one embodiment of a device for supporting a satellite dish in accordance with the present disclosure.

This written description uses examples to disclose embodiments of the disclosed invention, including the best mode, and also to enable any person skilled in the art to practice or make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present disclosure generally relates to devices for supporting objects above the ground, or above another surface or object, in a durable and consistent manner. Throughout this disclosure, specific details are provided relating to a pole for supporting a satellite dish, either above the ground or on a structure, such as a house. However, the present disclosure is not limited to this particular embodiment or application.

The present inventors have identified shortcomings to the existing devices and methods used for supporting satellite dishes known in the art. First, the different manufacturers of satellite dishes, as well as the type of content being provided, often require different sizes of poles to be installed for supporting the corresponding satellite dish device. For example, one satellite content provider may require a dish that has mounting mechanism requiring one diameter of pole, whereas another provider may require a second diameter of pole for installation. Consequently, installation personnel must maintain a sufficient stock of poles of all possible diameters in anticipation of the different requirements for installation.

Additionally, the present inventors have identified issues with maintaining the accuracy of aiming a satellite dish to the satellite over a long term period, which is of the utmost importance for reliability and clarity of the communicated signal. Specifically, round poles are presently used for installing satellite dishes, which leaves the entire dish and pole assembly susceptible to spin. Even if the mounting device is clamped securely to the pole, the entire pole and dish assembly may be rotated by bumping the dish, by a strong wind catching the dish, or simply by children playing around the pole in an innocent and unknowing manner.

Similar shortcomings arise from installing satellite dishes using the poles known in the art in regions of the world where ground freezing occurs. Specifically, the present inventors have identified that poles typically are not, or often practically cannot, be installed below the frost line to prevent heaving in winter. Moreover, using a pole having sufficient length to be installed to a depth below the frost line would necessarily increase the cost of the pole and further require additional stock to be held by installation personnel. Consequently, poles that are installed in the ground in regions that experience freezing are susceptible to heaving. This heaving disrupts the alignment of the satellite dish to the satellite, can damage the pole, and can even result in the damage to the pole and satellite dish upon tipping over, which may also damage other objects being impacted by the fall.

Furthermore, the applicants have identified that it is difficult for installation personnel to know how deep a pole has been installed in the ground, further exacerbating the issue of heaving. Beyond heaving, the difficulty in knowing how far to install a pole, or how far it has already been installed, risks maintaining sufficient depth to provide the structural integrity required by the pole to support the expensive satellite dish mounted on top.

Through testing and experimentation, the present inventors have developed the presently disclosed device and method for improving upon the pole for supporting a satellite dish. FIG. 1 depicts an exemplary satellite dish 2 that is supported above the ground 3, but which is supported by a pole 1 in accordance with the present disclosure. In some applications, the pole 1 may be installed directly into the ground 3, cemented in place, or clamped to another structure, such as a fence or building. The pole 1 is designed to remain rigidly fixed in the ground 3 after installation such that adjustments to the alignment of the satellite dish 2 to the satellite overhead (not shown) are made by adjusting the satellite dish 2 relative to the pole 1.

FIG. 2 shows the back or convex side of a typical satellite dish 2, including the mounting device 5 for coupling the satellite dish 2 to the pole 1. As shown, the pole 1 has a first end 12 that is installed in the ground 3, which is opposite of a second end 14 that is coupled to the pole 1 via the mounting device 5. The present inventors have noted that the mounting device 5 of a satellite dish 2 is commonly configured to be mounted to a round pole.

FIG. 3 shows the pole 1 of the present disclosure before being installed in the ground or being mounted to a satellite dish 2. The pole 1 has a first end 12 opposite a second end 14 with an axis z defined between the first end 12 and the second end 14. The pole 1 comprises a body 10 that surrounds the axis z and extends from the first end 12 to the second end 14. The main section 20 of the body 10 has a main cross-section 22 that is preferably hexagonally shaped. The present inventors have designed the main section 20 of the pole 1 to have the hexagonal shape to prevent spin between the pole 1 and the ground 3 as occurs with round poles known in the art. By providing the hexagonal shape of the main section 20, the presently disclosed pole 1 has inherent anti-spin protection and, thus, improved performance over poles known in the art. However, it should be known that the presently disclosed main cross-section 22 may have of other shapes that provide anti-spin protection, including but not limited to triangular, squared, pentagonal, septagonal shapes.

The pole 1 has a first mount section 30 that is closer to the first end 12 than the second end 14, shown here as extending from the first end 12 along the body 10. The first mount section 30 has a first cross-section 32, which is shown here to be circular, but which would be otherwise shaped. The first mount section 30 likewise has a first diameter 34.

At an end opposite the first mount section 30, the pole 1 has a second mount section 40 having a second cross-section 42, also shown to be circular. The second mount section 40 has a second diameter 44. The second mount section 40 is shown to be closer to the second end 14 than to the first end 12 and, in the example, begins at the second end 14 and extends along the pole 1 towards the first end 12.

In the embodiment shown, the first mount section 30 and second mount section 40 are shown to have a circular first cross-section 32 and a second cross-section 42 to accommodate the mounting device 5 of typical satellite dishes 2 despite the main section 20 of the pole 1 having a main cross-section 22. However, the first mount section 30 and/or the second mount 40 can be of any shape configured to engage with the mounting device 5 or mounting devices of interest, including but not limited to hexagonal shapes. It should also be known that the mounting device 5 need not directly contact the pole 1, but may be coupled through an intermediate component.

Moreover, by designing the pole 1 to have a different first diameter 34 and second diameter 44, the same pole 1 can be used for mounting two different sizes of mounting devices 5 for satellite dishes 2. This halves the number of poles 1 to be stocked by installation personnel, who need only flip the pole 1 to select the desired size for installation.

In the embodiment shown, the pole 1 further includes a first indentation section 50 and a second indentation section 60. The first indentation section 50 contains a plurality of first indentations 52, wherein the first indentations 52 extend inwardly from the body 10 of the pole 1 towards the axis z. Similarly, the second indentation section 60 has a plurality of second indentations 62 that also extend inwardly from the body 10 of the pole 1 towards the axis z.

Figure 4:
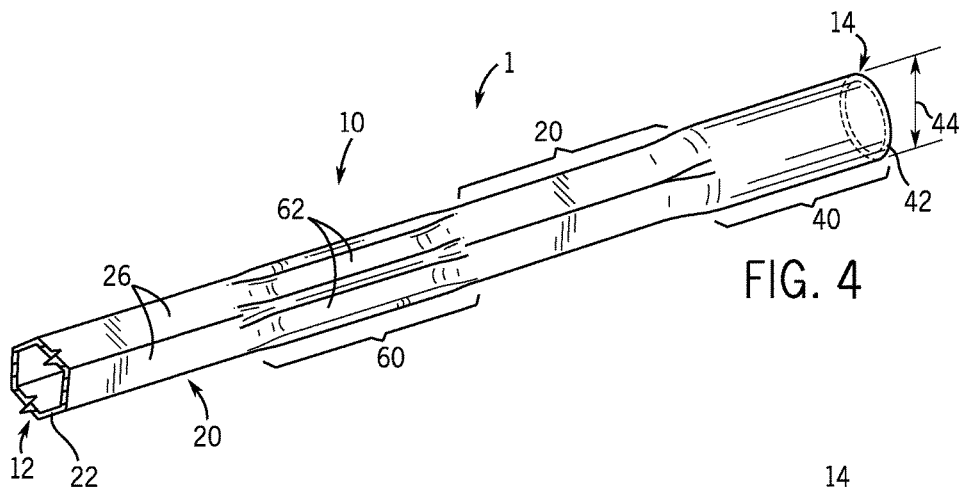
FIGS. 4-6 depicts exemplary mounting ends in accordance with the present disclosure
Figure 5:
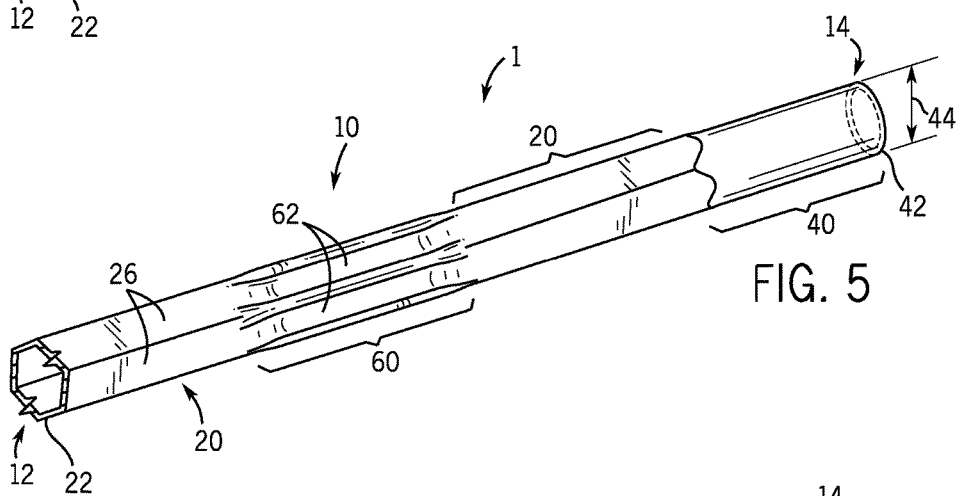
Figure 6:
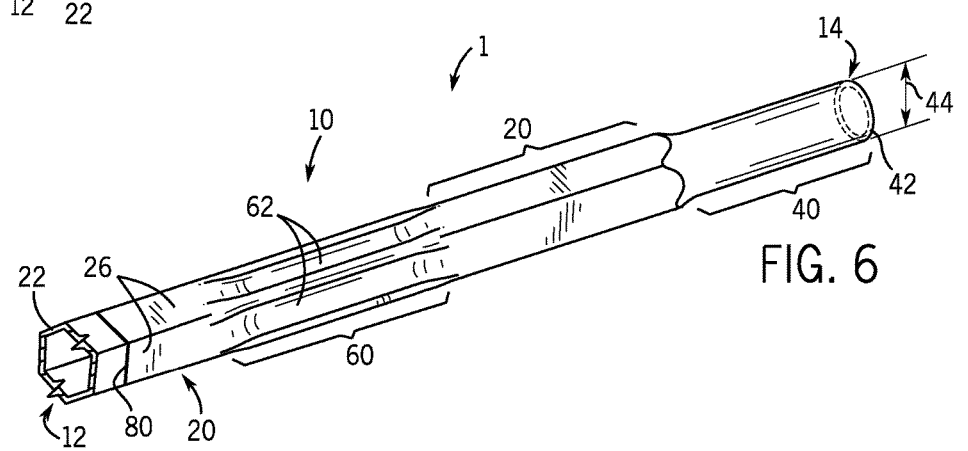

In the embodiments shown in FIGS. 4-6, the second indentations 62 in the second indentation section 60 each extend inwardly towards the axis z from a side 26 of the main cross-section 22 on the body 10. With reference to FIG. 3, it can be seen that the first indentations 52 of the first indentation section 50 are also shown to extend inwardly towards the axis z from the sides 26 of the main cross-section 22.

It should be noted that while the present embodiment shows at least two first indentations 52 and at least two second indentations 62, these indentations may be present in all sides 26 of the main cross-section 22, in one side 26 of the main cross-section 22, or any other number of sides 26. The indentations can also, or additionally, be made in the edge between adjacent sides 26 in the main cross-section 22, as opposed to each being within a side 26 as shown.

The present inventors have found that having one or more indentations in the pole 1 provides anti-heave protection for the pole 1 where the pole is installed in regions of the world where the ground freezes. Specifically, the first indentations 52 prevent heave when the first end 12 of the pole 1 is installed in the ground, and the second indentations 62 prevent heave when the second end 14 of the pole 1 is installed in the ground.

It should be known that the presently disclosed pole 1 need not have both a first indentation section 50 and a second indentation 60, depending on the intended use of the first end 12 and the second end 14 of the pole 1, respectively. Likewise, the first indentation section 50 and/or the second indentation section 60 may be positioned elsewhere on the pole 1, including within the first mount section 30 and/or the second mount section 40, respectively. Similarly, the first indentation section 50 and/or the second indentation section 60 may be positioned closer to the first end 12 and/or the second end 14 than the first mount section 30 and the second mount section 40, respectively.

In other embodiments, one or more of the first indentations 52 and/or the second indentations 62 extend outwardly away from the axis z, which also provide anti-heave protection for the pole 1 as discuss above. Similarly, one or more of the first indentations 52 and/or the second indentations 62 may extend perpendicularly or at other non-parallel angles relative to the axis z.

Beyond the benefit of providing anti-heave protection, indentations, as well as dimples, gussets, and other features, may be incorporated into or along the pole 1 for the purpose of adding strength. In some embodiments, this additional strength is provided where bending moments of the pole 1 are the greatest, including where the pole 1 meets the ground. The present inventors have identified that by providing these features, the pole 1 is better able to withstand or minimize deflection from high wind speeds, loads created by objects supported by the pole 1, and other loading conditions.

Returning to FIG. 3, it can be seen that the pole 1 has a first sight line 70 and a second sight line 80. The first sight line 70 is an indication for how far the pole 1 should be installed into the ground if the first end 12 of the pole 1 is being installed in the ground with the satellite dish 2 being mounted to the second end 14. In other words, the first sight line 70 provides guidance to the installation personnel to the install the first end 12 into the ground until the first sight line 70 is flush with the surface of the ground. Likewise, if the installation requires the satellite dish 2 to be mounted to the first end 12, the second end 14 of the pole 1 is installed into the ground until the second sight line 80 is flush with the surface of the ground. In this manner, the first sight line 70 and second sight line 80 ensure that the installation personnel have installed the pole 1 far enough into the ground to provide the structural integrity necessary to safely support the satellite dish 2. Likewise, the first sight line 70 and the second sight line 80 ensure that the installation personnel have installed the pole 1 sufficiently far in the ground to ensure that the first indentation section 50 or the second indentation section 60, as applicable, are sufficiently deep in the ground to provide the anti-heave protection described above.

FIGS. 4-6 depict three different configurations for the second mount section 40 of the pole 1, which may also be used for the first mount section 30 (though not separately shown). In one embodiment of the pole 1, the first mount section 30 has a first diameter 34 that is different than the second diameter 44, which enables the same pole 1 to be used to support satellite dishes 2 having different mounting requirements.

In order to provide both a main cross-section 22 and a first mount section 30 and second mount section 40 that are configured to function with mounting devices 5 for satellite dishes 2 known in the art, the present inventors developed devices and methods for swedging the main cross-section 22 into circular cross-sections. For example, FIG. 4 shows one embodiment whereby the second mount section 40 is swedged outward from the hexagonal shape of the main section 20 such that the second mount section 40 is a 2⅜ inch round shape. In other words, the second mount section 40 is swedged outwardly such that the second cross-section 42 is circular and the second diameter 44 is 2⅜ inches.

Similarly, FIG. 5 shows a second mount section 40 that is swedged outward such that the second cross-section 42 is circular and the second diameter 44 is 2 inches. In contrast, FIG. 6 shows an embodiment wherein the second mount section 40 has been swedged inwardly from the main cross-section 22 of the main section 20 such that the second cross-section 42 is circular and the second diameter 44 is 1⅔ inches.

It should be known that the pole 1 may be swedged outwardly or inwardly to have different second diameters 44 than those described above, which may be adjusted to adhere to the requirements of the particular satellite dishes 2 and their mounting devices 5. Similarly, a particular embodiment of a pole 1 may be configured such that the first mount section 30 is swedged to have a first diameter 34 that is 2⅜ inches, 2 inches, or 1⅔ inches, while the second mount section 40 is swedged to have a second diameter 44 that is different than the first diameter 34. This enables installation personnel to carry only half the stock of poles 1 to support installation of satellite dishes 2 having differing installation requirements. For example, installation personnel may carry a pole 1 having a first mount section and a second mount section 40 that corresponds to the mounting requirements of the two most popular satellite dishes, or perhaps the two types that they are contracted to install. In cases where more than two mounting requirements exist, the pole 1 of the present disclosure nevertheless enables the stock to be reduced by providing first mount sections 30 and second mount sections 40.

Alternately, the first diameter 34 and second diameter 44 can be the same. Likewise, one of the first mounting section 30 or the second mounting section 40 may have a hexagonal cross-section like the main cross-section 22. While these alternative embodiments may not provide the flexibility to rotate the pole 1 to accommodate the requirements of multiple mounting devices 5, they nonetheless provide the other benefits described above.

It should be known the first mounting section 30 and second mounting section 40 are configurable to comply with the requirements of any mounting device 5, including different shapes and sizes as the case may be.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

We claim:

1. A device configured to support an object above the ground, the device comprising:
    a first end and a second end that is opposite the first end;
    an axis defined between the first end and the second end;
    a body that surrounds the axis and extends from the first end to the second end;
    a first mount section of the body that is closer to the first end than to the second end, wherein the first mount section has a first cross-section and is configured to be coupled to the object;
    a second mount section of the body that is closer to the second end than to the first end, wherein the second mount section has a second cross-section and is configured to be coupled to the object;
    a main section of the body located between the first mount section and the second mount section, wherein the main section has a main cross-section, wherein the first cross-section is different than the main cross-section, wherein the main cross-section and the second cross-section are different, and wherein the main cross-section has a hexagonal shape;
    a first indentation in the body, wherein the first indentation is closer to the first end than to the second end; and
    a second indentation in the body, wherein the second indentation is closer to the second end than to the first end;
    wherein the device is configured to be installed in the ground such that one of the first indentation or the second indentation are below the ground; and
    wherein the first cross-section and the second cross section each have a circular shape.

2. The device according to claim 1, wherein the first cross-section has a first area, wherein the second cross-section has a second area, wherein the main cross-section has a main area, and wherein the first area is greater than the main area.

3. The device according to claim 1, wherein the first cross-section has a first area, wherein the second cross-section has a second area, wherein the main cross-section has a main area, and wherein the second area is smaller than the main area.

4. The device according to claim 3, wherein the first area and the second area are different.

5. The device according to claim 4, wherein the first area and the main area are different.

6. The device according to claim 1, wherein the first indentation in the body is within exactly one side of the hexagonal shape of the main cross-section.

7. The device according to claim 1, wherein the first indentation projects inwardly towards the axis.

8. A device configured to support an object above the ground, the device comprising:
    a first end and a second end that is opposite the first end;
    an axis defined between the first end and the second end;
    a body that surrounds the axis and extends from the first end to the second end;
    a first mount section of the body that is closer to the first end than to the second end, further comprising a first sight line along the main section that is closer to the first end than to the second end, wherein the first sight line signifies a distance from the first end to the first sight line wherein the first mount section has a first cross-section and is configured to be coupled to the object;
    a second mount section of the body that is closer to the second end than to the first end, wherein the second mount section has a second cross-section and is configured to be coupled to the object;
    a main section of the body located between the first mount section and the second mount section, wherein the main section has a main cross-section;
    a first indentation in the body, wherein the first indentation is closer to the first end than to the second end;
    a second indentation in the body, wherein the second indentation is closer to the second end than to the first end; and
    a first sight line along the main section that is closer to the first end than to the second end, wherein the first sight line signifies a distance from the first end to the first sight line;
    wherein the first cross-section is different than the main cross-section, and wherein the device is configured to be installed in the ground such that one of the first indentation or the second indentation are below the ground.

9. The device according to claim 8, wherein the first indentation is closer to the first end than the first sight line is to the first end such that the first indentation prevents heave when the device is installed in the ground to a depth whereby the first sight line is at or below the ground.

10. The device according to claim 9, wherein the object that the device is configured to support above the ground is a satellite dish.

11. A method for supporting an object above the ground, the method comprising:
    providing a device having a first end and a second end that is opposite the first end, an axis defined between the first end and the second end, a body that surrounds the axis and extends from the first end to the second end, a first mount section of the body that is closer to the first end than to the second end, wherein the first mount section has a first cross-section and is configured to be coupled to the object, a second mount section of the body that is closer to the second end than to the first end, wherein the second mount section has a second cross-section and is configured to be coupled to the object, and a main section of the body located between the first mount section and the second mount section, wherein the main section has a main cross-section, wherein the first cross-section is different than the main cross-section;

indenting the body at a first indentation, wherein the first indentation is closer to the first end than to the second end; and indenting the body at a second indentation, wherein the second indentation is closer to the second end than to the first end;

coupling the object to one of the first mount section or the second mount section, wherein a ground end is the one of the first mount section or the second mount section that is not coupled to the object; and installing the ground end of the device into the ground such that one of the first indentation or the second indentation is in the ground;

wherein the first cross-section has a first area and the main cross-section has a main area, further comprising swedging the first mount section outwardly such that the first area is greater than the main area.

12. The method according to claim 11, wherein the second cross-section has a second area and the main cross-section has a main area, further comprising swedging the second mount section inwardly such that the second area is less than the main area.

13. The method according to claim 12, wherein the main cross-section has a hexagonal shape, and wherein the first cross-section and the second cross section each have a circular shape.

14. The method according to claim 13, wherein the first cross-section has a first area, and wherein the first area and the second area are different.

15. A device configured to support a satellite dish above the ground, the device comprising:

a first end and a second end that is opposite the first end;

an axis defined between the first end and the second end;

a body that surrounds the axis and extends from the first end to the second end;

a first mount section of the body that is closer to the first end than to the second end, wherein the first mount section has a first cross-section that is circular and is configured to be coupled to the satellite dish;

a second mount section of the body that is closer to the second end than to the first end, wherein the second mount section has a second cross-section that is circular and is configured to be coupled to the satellite dish;

a main section of the body located between the first mount section and the second mount section, wherein the main section has a main cross-section that is hexagonal;

a first indentation that projects inwardly from the body of the main section towards the axis, wherein the first indentation is closer to the first mount section than to the second mount section; and a second indentation that projects inwardly from the body of the main section towards the axis, wherein the second indentation is closer to the second mount section than to the first mount section;

wherein the first cross-section has a first area, and wherein the second cross-section has a second area that is different than the first area.

\* \* \* \* \*